United States Patent [19]

Aoyagi et al.

[11] Patent Number: 5,896,245
[45] Date of Patent: Apr. 20, 1999

[54] STRUCTURE IN A DISK DRIVE SYSTEM FOR ATTACHING A LOAD BEAM TO A HEAD ACTUATOR CARRIAGE INCLUDING A MOUNTPLATE HAVING SIDE ENDS SURROUNDING A SWAGE HOLE

[75] Inventors: Akihiko Aoyagi, Fujisawa; Hiroyasu Tsuchida, Yokohama; Tatsuo Nakamoto, Sagamihara; Hitoshi Tsujino, Fujisawa; Shingo Tsuda, Yokohama; Mutsuro Ohta, Ebina, all of Japan

[73] Assignee: International Business Machines Corporation, Armonk, N.Y.

[21] Appl. No.: 08/675,778

[22] Filed: Jul. 5, 1996

[30] Foreign Application Priority Data

Jul. 10, 1995 [JP] Japan .................................. 7-173192

[51] Int. Cl.⁶ .............................. G11B 5/55; G11B 5/60
[52] U.S. Cl. ........................................................... 360/104
[58] Field of Search .................................... 360/104, 103

[56] References Cited

U.S. PATENT DOCUMENTS

| 4,943,875 | 7/1990 | Reidenbach et al. | 360/104 |
| 5,313,355 | 5/1994 | Hagen | 360/104 |
| 5,602,698 | 2/1997 | Miyazaki et al. | 360/104 |
| 5,777,826 | 7/1998 | Tsuchida et al. | 360/104 |
| 5,796,555 | 8/1998 | Aoyagi et al. | 360/104 |
| 5,812,343 | 9/1998 | Budde et al. | 360/104 |

FOREIGN PATENT DOCUMENTS

| 502646 | 9/1992 | European Pat. Off. | 360/104 |
| 05166315 | 7/1993 | Japan | 360/104 |

*Primary Examiner*—Robert S. Tupper
*Attorney, Agent, or Firm*—Joan Pennington

[57] ABSTRACT

In attaching a load beam to a carriage, the swage attachment is used between the carriage and a mountplate, while the load beam is attached to the mountplate by welding and other binding means, to create a structure in which the load beam does not come into direct contact with the swage part, so that a structure is obtained in which the load beam is hardly subject to deformation or other direct influences from the swage operation. In addition, by forming the attaching plate side of the load beam to envelope a carriage, or by extending both sides of the load beam from the central portion in the longitudinal direction toward the carriage, a structure improved in the stability of load beam attachment is obtained.

7 Claims, 5 Drawing Sheets

STRUCTURE IN A DISK DRIVE SYSTEM FOR ATTACHING A LOAD BEAM TO A HEAD ACTUATOR CARRIAGE INCLUDING A MOUNTPLATE HAVING SIDE ENDS SURROUNDING A SWAGE HOLE

FIELD OF THE INVENTION

The present invention relates to a disk drive system and more particularly, to a structure of the attachment of a suspension to a carriage arm, where the suspension attaches a signal transducer head to one end.

DESCRIPTION OF THE PRIOR ART

Recently in magnetic disk drive systems, downsizing, in particular thinner structurizing advances and according various structural corresponding measures are made. For example, the attachment structure of a magnetic-head supporting suspension to an actuator, the attachment structure of a magnetic head to a load beam, and so on can be mentioned. FIG. 8 shows a general structure of suspension for supporting a signal transducer head, in which the signal transducer head 8 is supported by a flexure 10C in a gimbal support structure and the flexure 10C is joined to the load beam 10. The load beam 10 is fixed to an actuator arm and the actuator arm is driven by a motor to locate a signal converter head at a predetermined position of the disk, then reading or writing of a signal is executed.

To provide mechanical characteristics such as a predetermined natural frequency and rigidity to itself, the load beam 10 bends its side edge at a nearly right angle to the base plane to form a flange. The flange is formed on both sides of the load beam and plays a part in providing required mechanical characteristics to the load beam.

In an attempt to make a magnetic disc drive apparatus thinner, it is important to what extent the housing can be made thinner as a whole by making devices and instruments to be housed in this housing thinner in a clever way. In particular, the structure for attaching a signal converter head disposed above each recording surface of the magnetic disk to an actuator to move to a predetermined position of the recording surface, determines the size of a gap between the stacked magnetic disks. In addition, because signal converter heads are further disposed above the top layer and below the bottom layer of magnetic disk, the structure for attaching a signal converter head to an actuator is an important factor for determining the thickness of the whole housing.

Formerly, a swage, also called caulking, has been used to attach the other end of the suspension, with a signal converter head attached thereto on one end, onto the actuator. This serves to fix the outer periphery of a boss onto the inner surface of a through hole of the actuator arm under press contact and pressure application by inserting a boss having an opening formed at the other end of the suspension into a through hole formed on the actuator arm, load-beam attaching portion of the actuator, and by letting a ball slightly larger than the inside diameter of the opening of the boss pass through.

FIGS. 7 to 9 show a conventional attachment structure for load beams. FIG. 7 shows a structure for attaching a plurality of load beams 10 to an actuator 9. An actuator 9 on the attaching side of the attachment plate 10B in this load beam 10 has a comb-shaped actuator arm 9A made of aluminum and a plurality of through holes 9B (cf. FIG. 9) are coaxially provided on this actuator arm 9A.

A method for attaching this load beam 10 to an actuator 9 will be described. As shown in FIG. 8, the load beam 10 is so aligned with the attachment plate 10B that a swage hole coincides with the hole of the attachment plate on the same line.

FIG. 9 shows an attachment structure of a plurality of load beams 10 to an actuator 9 by means of swage. As shown in FIG. 9, bosses 10E of the attachment plate 10B as surrounding the load beam 10 are inserted from the end of the respective openings of the through hole 9B on the actuator arm 9A. The inside diameter of this though hole 9B is slightly, e.g., scores of microns, greater than the outside diameter of a boss 10e. A steel ball of slightly greater diameter than inside diameter of the boss 10E is put under pressure from the through hole 10D in the attachment plate 10B to go through the through hole 9B in the actuator arm 9A. Then, the above and below bosses 10E are enlarged and the outer surface is pressed and fixed onto the inner surface of the through hole 9b in the actuator arm 9A.

In an attachment structure of a plurality of load beams as shown in FIG. 9, it becomes possible to simultaneously execute this swage operation on a plurality of through holes 9B, thereby enhancing the operative function.

However, this swage attachment structure of a suspension has a problem that the shape of a boss changes in letting a ball through the opening of the boss, resulting a change in the load of the head suspension assembly (HSA).

A change in the load of a HSA causes a change in the flying height of a slider for mounting a signal converter head as well. With increasing flying height, reading or writing of signals on the disk becomes impossible, whereas a fear of contact between the disk and converter occurs with decreasing flying height, resulting in a problem that the available period as a disk drive becomes shorter. At present, there is no method for completely avoiding this problem. As countermeasures for the present, there has been adopted a method comprising the steps of predicting a change in load due to swage and adding a regulating load corresponding to a predicted change in load at the stage of head suspension assembly and the like.

SUMMARY OF THE INVENTION

To solve the above described problem in a conventional attachment structure of a load beam to a head actuator carriage, it is an object of the present invention to provide a stable attachment structure of a load beam to an actuator.

In particular, when using caulking with swage at actuator suspension attachment part, it is another object of the present invention to provide an actuator suspension attachment structure, enabling a stable attachment less affected by a change in load occurring due to swage.

To achieve the above object, the inventive actuator attachment structure of the other end of a suspension with a signal converter head in a disk drive apparatus attached to one end comprises as follows:

A mountplate to which a carriage is attached by the swage operation is separated from the load beam and the load beam is attached to the mountplate by welding to create a structure in which the load beam is not swaged and does not come into direct contact with the swage portion. Thus, a structure is obtained in which the load beam is hardly subject to deformation or other direct influences from the swage operation.

Furthermore, by forming the attaching plate side of the load beam to envelope a carriage, or by extending both sides of the load beam from the central portion in the longitudinal direction toward the carriage, a structure having improved stability of load beam attachment is obtained.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In brief, an advantage of the invention is that the attachment structure of a load beam to a carriage according to the present invention enables the influence of load beam deformations caused by the swage to be efficiently reduced even though using the swage process, and thus provides a stable attachment structure.

Figure 1:
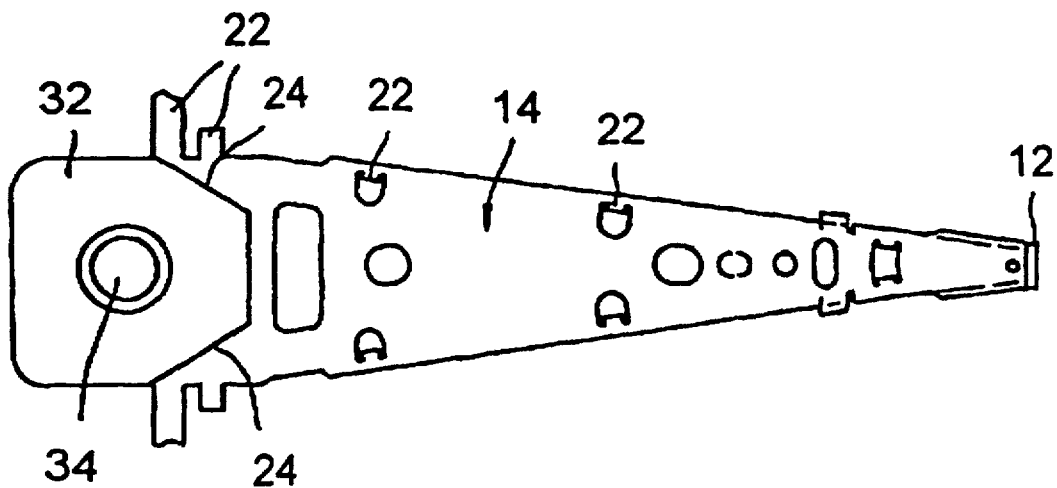
FIG. 1 is a plan view of one embodiment of load beam according to the present invention.
Figure 2:
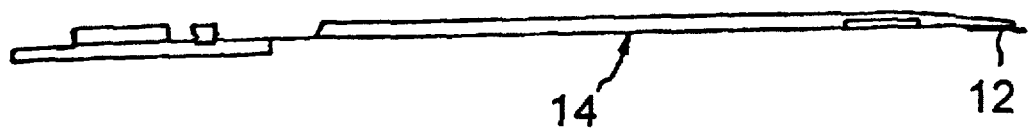
FIG. 2 is a side view of one embodiment of load beam according to the present invention.

FIGS. 1 and 2 show one embodiment of the present invention. First, referring to FIG. 1, the present invention will be described. FIG. 1 is a plan view of a load beam 14 according to the present invention, while FIG. 2 is a side view thereof. The signal converter head (not shown) is supported by a flexure 12 in a gimbal support structure, the flexure 12 is joined to one end of the load beam 14 and the other end of the load beam 14 is fixed to an actuator arm (not shown). The actuator arm is driven by the drive of a voice coil motor (VCM) and locates the signal converter head at a predetermined position of the disk, then read or write of data is executed.

To the signal converter head is connected a signal line for the transfer of data write or data read signals. This signal line is disposed along the load beam 14, led out to the actuator arm side and connected to a predetermined circuit. On the load beam 14, means for holding signal lines 22, such as caulking for signal line fixation, are formed, thereby preventing the signal lines from slipping off over the load beam 14.

To the carriage side of the load beam, a mountplate 32 is attached by binding means, such as welding. The mountplate 32 has a swage hole 34 for joining a carriage 40 (FIGS. 3–6). As seen from FIGS. 1 and 2, the shape of the carriage side of the load beam 14 comprises extension portions 24 on both sides and the both sides are extended toward the carriage.

Figure 3:
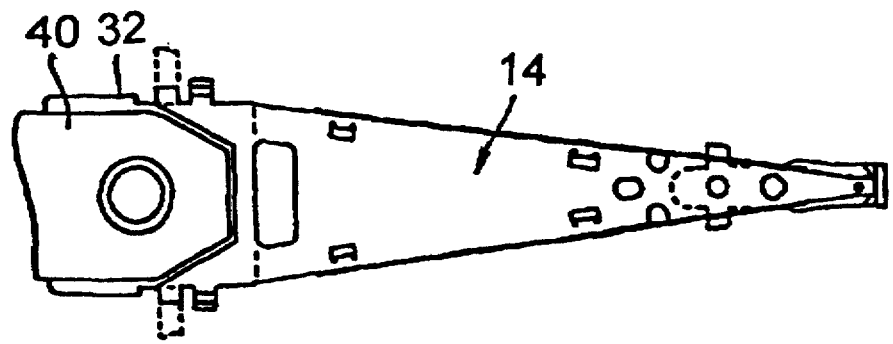
FIG. 3 is a plan view showing the carriage attachment structure of one embodiment of load beam according to the present invention.
Figure 4:
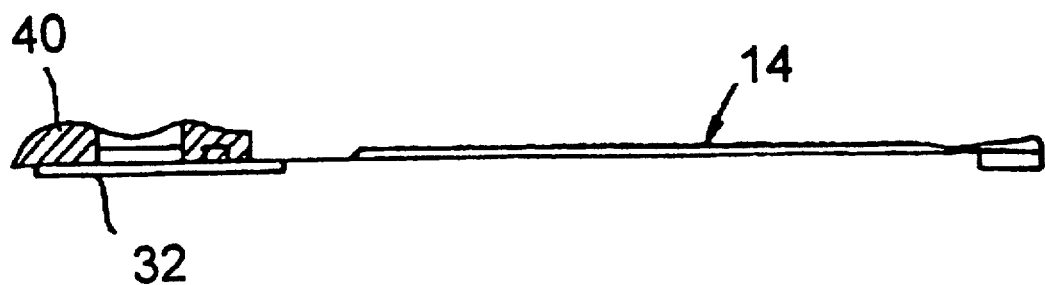
FIG. 4 is a side view showing the carriage attachment structure of one embodiment of load beam according to the present invention.

FIGS. 3 and 4 are a plan view and a sectional view showing the attachment structure of a mountplate 32 to the carriage 40 by means of swage. As seen from both figures, the carriage side of the load beam 14 is formed to surround the carriage. The swage is executed only between the mountplate 32 and the carriage 40 and the load beam 14 is free from a direct influence of stress and deformations occurring due to swage because of being a structure separated from the binding structure of swage by a distance greater than the radius of the swage hole 34.

Figure 5:
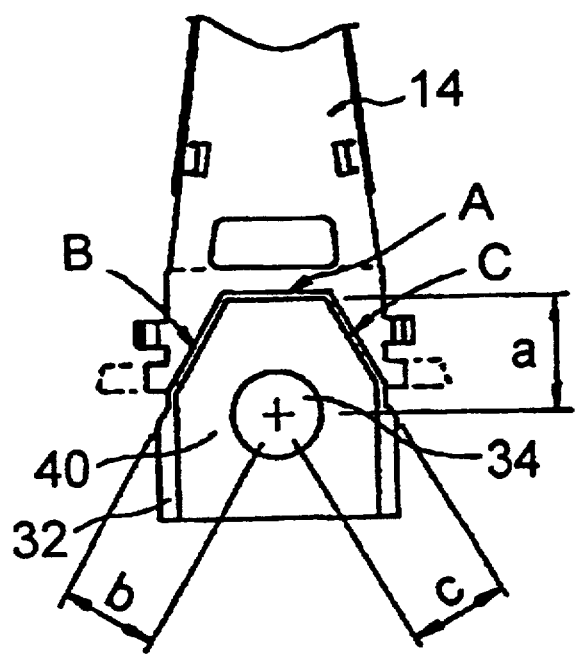
FIG. 5 is to illustrate the carriage side attachment part of one embodiment of load beam according to the present invention.

FIG. 5 is to illustrate the attachment portion of the load beam 14 to a carriage 40. The carriage end of the load beam 14 comprises an attachment edge including three sides A, B and C. These three sides are fastened to the mountplate 32 in such a shape as to surround the carriage 40, where the distance a, b and c from the central axis of swage hole 34 to three straight lines are in a relation a=b=c or a>b=c. The reason for b=c is for balancing the influence from mountplate deformations caused by the swage. The longitudinal symmetry maintains a balance in the distribution of stress due to swage or the occurrence of deformations caused thereby.

On the other hand, the reason why the distance a is made equal to or greater than the other b and c is that the influence of mountplate deformations caused by the swage becomes smaller in the direction toward a signal converter head. For a larger distance a, the influence of mountplate deformations caused by the swage reaches earlier to the side B or C and becomes difficult to reach to the distant side A. Thus, the possibility of load beam deformation in the direction toward a signal converter head can be reduced.

Figure 6:
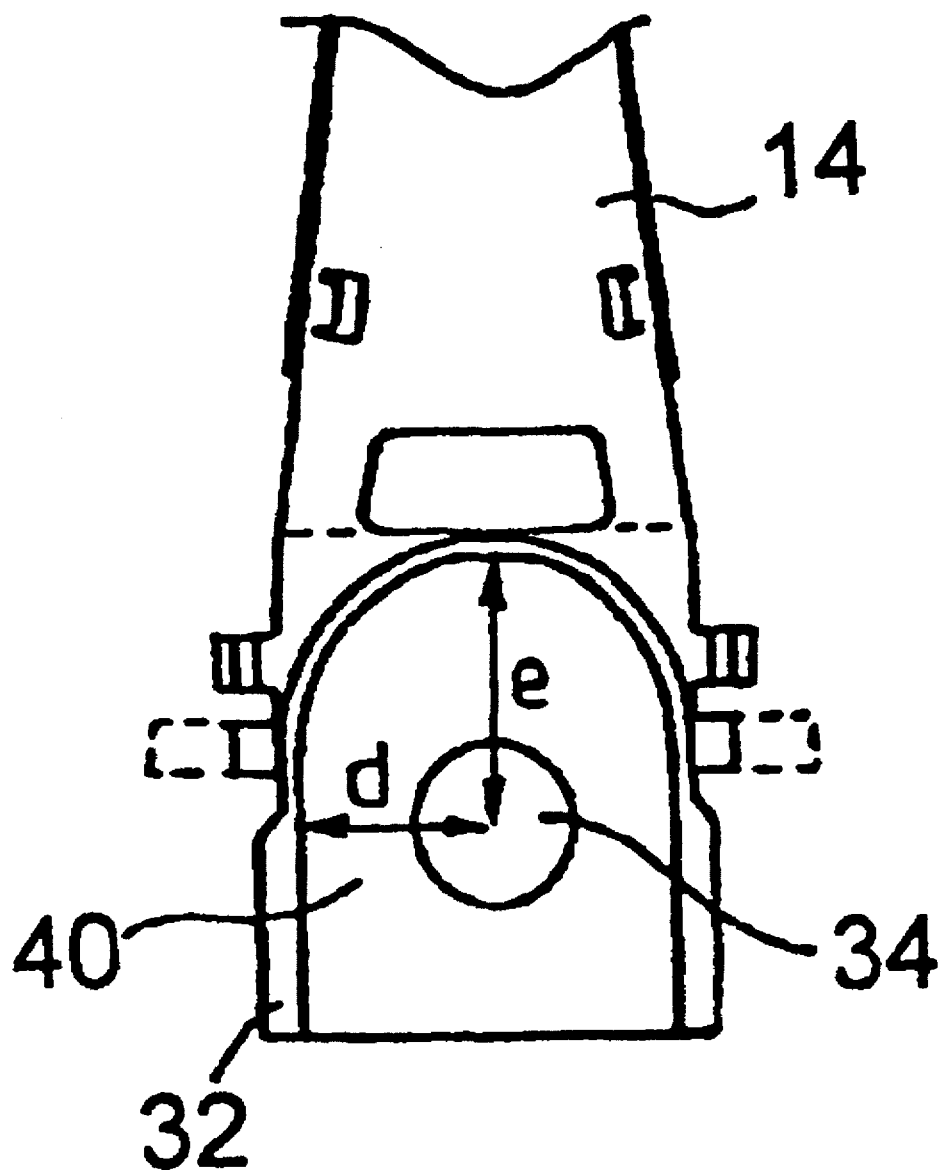
FIG. 6 is to illustrate the carriage side attachment part of another embodiment of load beam according to the present invention.
Figure 7:
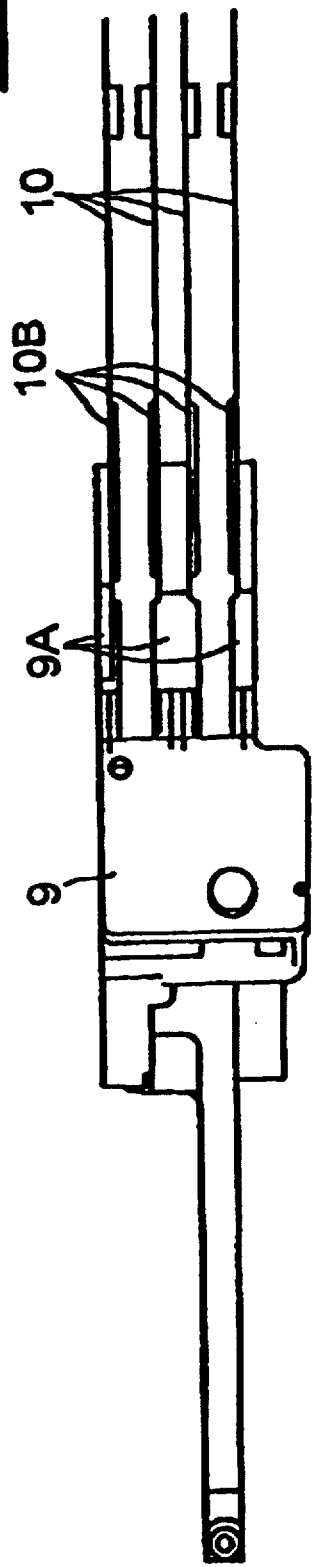
FIG. 7 is a side view showing the carriage attachment structure of a load beam.
Figure 8:
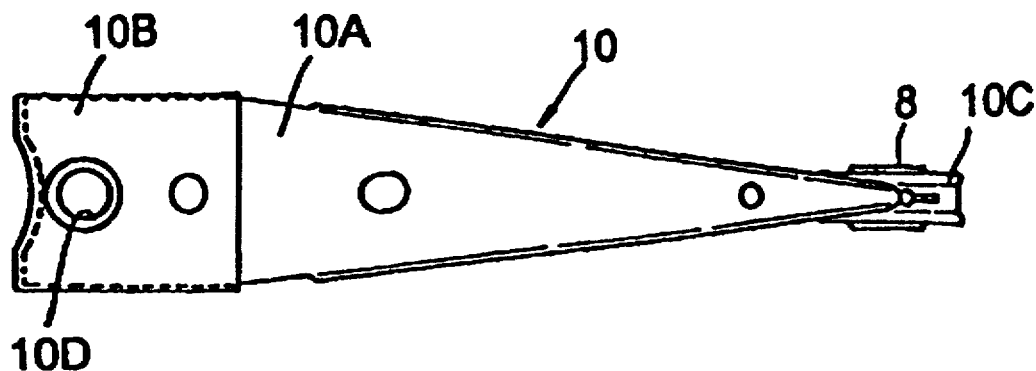
FIG. 8 is a plan view showing a conventional load beam and mountplate.
Figure 9:
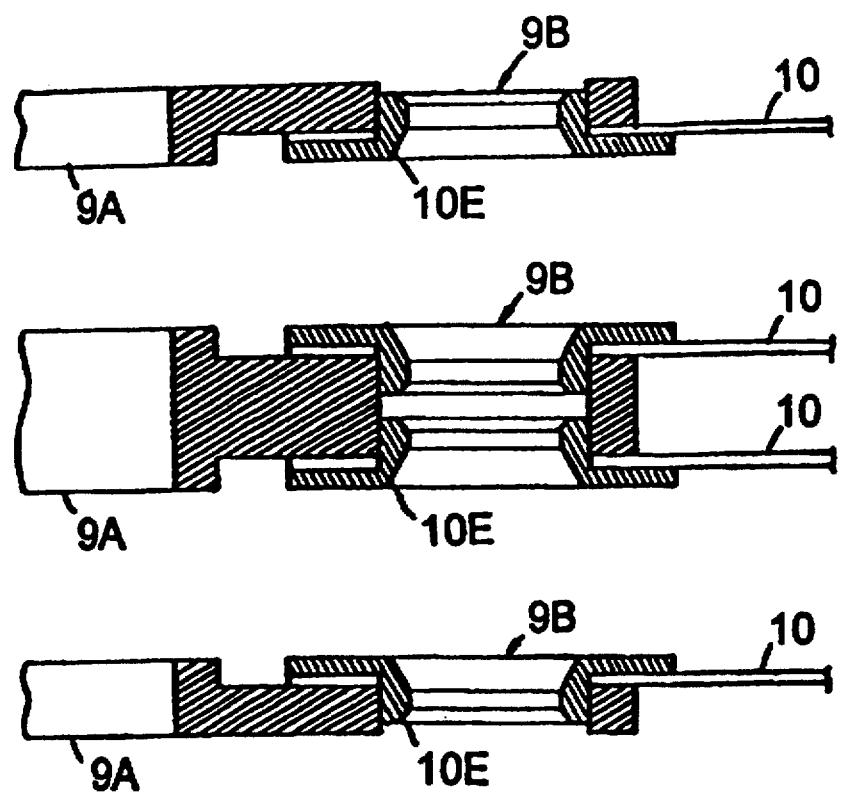
FIG. 9 is to illustrate the attachment structure of a conventional load beam to a carriage.

FIG. 6 shows another embodiment, where the attachment edge of the load beam 14 is formed by a smooth curve, not by the three straight lines A, B and C shown in FIG. 5. This curve also has the same characteristics as the embodiment formed by the above three straight lines. Letting d and e to be the respective distance from the center of the swage hole 34 to the transverse ends and toward a signal converter head as shown in FIG. 6, this construction is such that the distance e is at least equal to or greater than d. The reason for this is similar to the one described in FIG. 5.

While the present invention has been described with reference to the details of the embodiments of the invention shown in the drawing, these details are not intended to limit the scope of the invention as claimed in the appended claims.

What is claimed is:

1. A head suspension assembly for a disk drive system, said assembly comprising:

an elongated load beam having a first end including means for supporting a signal converter head, a second end defined by an attachment edge and a longitudinal axis extending between said first and second ends;

a head actuator carriage including an actuator arm having a mounting hole extending through said arm; and a mountplate in face to face contact with said actuator arm and having a swage hole aligned with said actuator arm mounting hole, said mounting plate being attached to said actuator arm by swaging at said swage hole;

said mounting and swage holes having a common central axis intersecting said longitudinal axis of said load beam;

binding means for attaching said attachment edge of said load beam to said mountplate at a region radially spaced from said swage and mounting holes by a distance greater than the radius of said swage hole;

said attachment edge of said load beam being symmetrical about both said central axis of said mounting hole and said longitudinal axis of said load beam; and said attachment edge including a central portion intersected by said longitudinal axis of said load beam and including flanking portions continuous with said central portion and extending away from said first end of said load beam and partly around said central axis of said mounting hole.

2. The head suspension assembly set forth in claim 1, the distance from said central axis to said central portion being at least as great as the distance from said central axis to said flanking portions.

3. The head suspension assembly set forth in claim 2, the distance from said central axis to said central portion being equal to the distance from said central axis to said flanking portions.

4. The head suspension assembly set forth in claim 2, the distance from said central axis to said central portion being greater than the distance from said central axis to said flanking portions.

5. The head suspension assembly set forth in claim 2, each of said central portion and said flanking portions of said attachment edge being a straight line.

6. The head suspension assembly set forth in claim 2, said central portion and said flanking portions of said attachment edge being segments of a smooth cure.

7. The head suspension assembly set forth in claim 1, said binding means comprising welding.

* * * * *